H. WICKHAM, Jr.
Glass-Molds.
No. 135,502.
Patented Feb. 4, 1873.
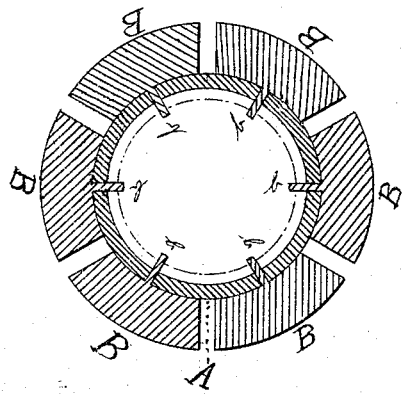
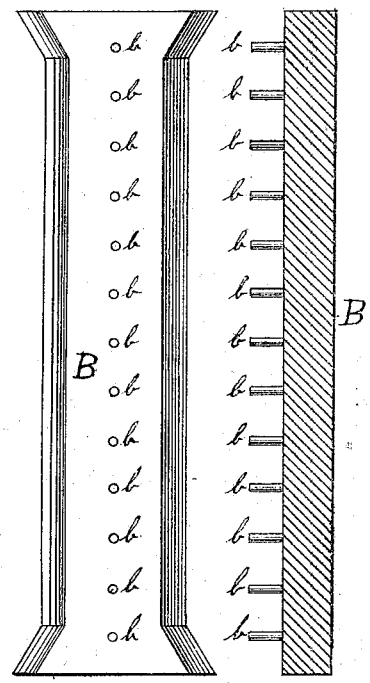
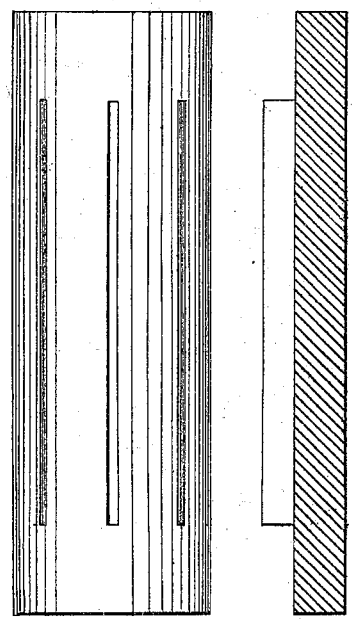
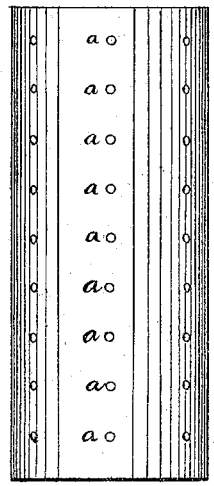
Witnesses:
Otto Geifsring
Rollin   
Inventor:
Horace Wickham jr.

UNITED STATES PATENT OFFICE.

HORACE WICKHAM, JR., OF CHICAGO, ILLINOIS.

IMPROVEMENT IN GLASS-MOLDS.

Specification forming part of Letters Patent No. 135,502, dated February 4, 1873.

*To all whom it may concern:*

Be it known that I, HORACE WICKHAM, Jr., of Chicago, Cook county, State of Illinois, have made certain Improvements in Manufacturing Glass Chimneys for Lamps, &c., of which the following is a specification:

Nature and Object of Invention.

The object of my invention is to make openings of any form or shape in a glass chimney during the process of molding, pressing, or blowing the same; and consists in devices for producing the same, which will hereinafter be more fully described.

In the drawing, Figure 1 is a cross-section of a mold, showing chimney in dotted lines. Fig. 2 is a front view of one of the segmental sections of the mold. Fig. 3 is a side view of the same. Fig. 4 is a side view of a mold provided with round openings or perforations. Figs. 5 and 6 are modifications of a mold showing longitudinal slots or openings, and a corresponding segmental section for the same.

General Description.

A is a mold, having openings $a$, as shown in Figs. 1 and 4. B are the segmental sections provided with projections $b$, which pass through the openings in the mold A, and project far enough through the same so that as the glass is blown in the mold it surrounds the projections upon the segmental sections, and which by any suitable mechanism are withdrawn before or after the glass becomes set, leaving openings in a chimney corresponding to the projections used.

I do not wish to confine myself to any form of openings or projections, as a mold can be provided with slots extending part its length, and the segmental sections having blades to correspond with the same, as shown in Figs. 5 and 6, which will leave longitudinal openings in a chimney instead of round openings; and the operation is the same as above described.

I can as an equivalent of this arrangement dispense with the segmental sections, &c., and make the mold in sections, each section having cast or screwed in its interior the projections, &c., and the parts of the mold must then slide to and from each other in closing or opening.

I claim—

A glass-mold with perforated or slotted walls, in combination with sectional segments, having corresponding projections for entering said apertures, all as and for the purpose set forth.

HORACE WICKHAM, JR.

Witnesses:
    OTTO LEISSRING,
    ROLLIN WHITF.